United States Patent [19]
Bardeau

[11] 3,742,931
[45] July 3, 1973

[54] DEVICES FOR HEATING OR COOKING FOODS
[76] Inventor: William Milton Bardeau, 44 Princess Margaret-Boulevard, Islington, Ontario, Canada
[22] Filed: Dec. 28, 1971
[21] Appl. No.: 212,907

[52] U.S. Cl.................................. 126/369, 126/20
[51] Int. Cl. ............................................ A47j 27/04
[58] Field of Search................... 126/20, 369, 369.1, 126/369.2, 369.3; 138/42

[56] References Cited
UNITED STATES PATENTS
3,500,818   3/1970   Elias ................................... 126/369
2,100,504   11/1937   Crosley et al........................ 138/42

Primary Examiner—Edward G. Favors
Attorney—Weldon F. Green

[57] ABSTRACT

The invention relates to appliances for processing foods by the use of steam using, in the conduit system for supplying water from a pressure source, a length of capillary tube calibrated to deliver water at a flow rate sufficient only to generate the volume of steam necessary to achieve optimum conditions of temperature and moisture content in the food processing compartment and using a distensible reservoir in combination with the capillary tube responsive to variations in pressure to automatically accumulate a charge of water when the appliance is shut down to provide a surge of water at the start-up of the next sequence to purge the food processing compartment of the atmosphere.

8 Claims, 6 Drawing Figures

PATENTED JUL 3 1973
3,742,931
SHEET 1 OF 2
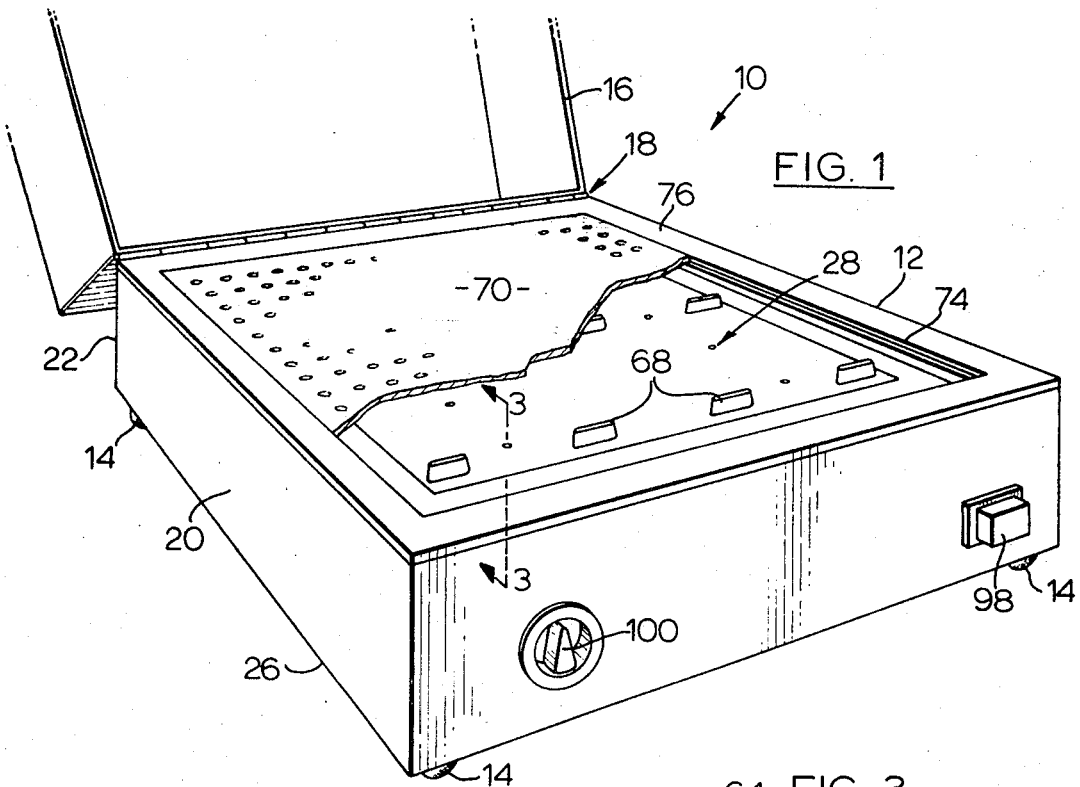
FIG. 1
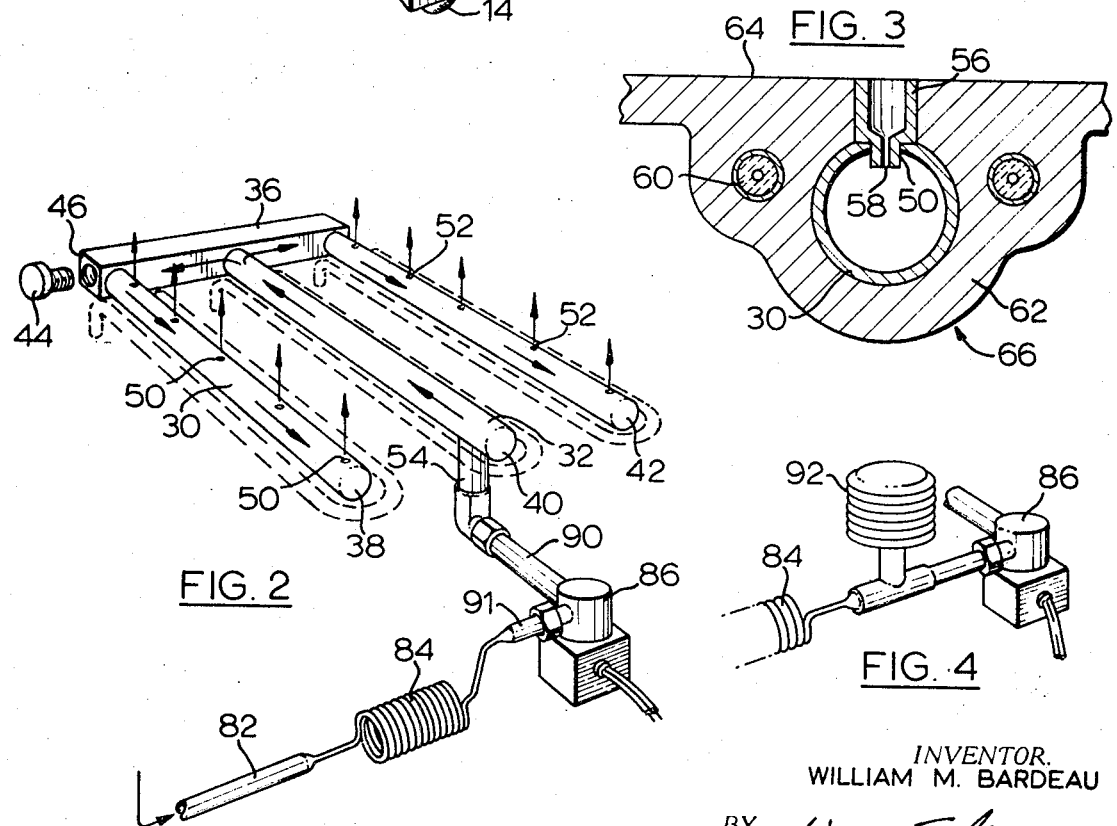
FIG. 2
FIG. 3
FIG. 4
INVENTOR.
WILLIAM M. BARDEAU
BY Weldon F. Green
Agent 3,742,931

DEVICES FOR HEATING OR COOKING FOODS

SUMMARY OF THE INVENTION

This invention relates to improvements in appliances for restaurants, cafeterias, kitchens, food stands and like premises which use steam as the medium for reconstituting, heating, freshening, thawing and cooking food products.

The object of this invention is to provide an appliance useful for the purposes outlined in which optimum conditions of temperature and moisture content can be achieved and maintained in the oven or food compartment of the unit, automatically, for each category of food product to be processed.

Another object of this invention is to provide an appliance in which optimum conditions of temperature and moisture content can be established for a particular food product substantially immediately upon placing the unit in operation.

Still another object is to provide an appliance in which the generation of an excessive or dangerous volume of steam is avoided thereby minimizing the risk of damage or injury to the premises or persons in the vicinity and where the water must be treated or conditioned conserving such water source which is a substantial item of expense in the operation of the appliance.

Still another object of this invention is to provide an appliance which can be economically manufactured, will be highly efficient in use, durable, compact and which can be installed and placed in operation very readily.

One feature of this invention resides in providing in the conduit system supplying water from a source under pressure to the steam generating chamber or boiler of the appliance, a length of capillary tube calibrated under the conditions of input water pressure and volume of the oven or food compartment of the appliance, to deliver water at a flow rate sufficient only to generate the volume of steam necessary to achieve the optimum conditions of temperature and moisture content for the food products to be processed.

Another feature resides in providing in the conduit system a valve for shutting off the water supply downstream from the length of capillary tube and installing between the capillary tube and valve a resiliently distensible reservoir responsive under conditions of increased water pressure to accumulate a charge of water, as when the valve is closed, and under conditions of decreased pressure to expel the charge, as when the valve is opened downstream to the steam generating chamber or boiler which is at lower pressure, to thereby supply a surge of water in sufficient quantity to purge the oven or food compartment of the atmosphere and replace it with steam immediately upon placing the appliance in operation.

Still another feature of the invention resides in providing the capillary tube in convuluted form, for example in the form of a helix or a spiral, to thereby improve its structural strength and to minimize space requirements for its installation within the appliance.

DESCRIPTION OF THE DRAWINGS

These and other objects and features of the invention will become apparent upon reading the following description and claims in conjunction with the accompanying drawings in which:

FIG. 1 is a perspective view of a typical appliance constructed in accordance with the invention taken from a point above and to one side of the front of the appliance with a portion of the hinged lid shown in the upright position and a portion of the perforated supporting surface for articles of food broken away;

FIG. 2 is a perspective view of the principal components of the steam generating system for the appliance of FIG. 1 with the electrical resistance elements for generating heat illustrated in broken lines and with the surrounding structure broken away;

FIG. 3 is an enlarged view in vertical cross section of the appliance of FIG. 1 taken along the lines 3—3 of FIG. 1 with the surrounding structure broken away;

FIG. 4 is a perspective view of a section of the conduit system for supplying water to the steam generating chamber or boiler of the appliance of FIG. 1 illustrating one embodiment of a component for accumulating a charge of water for the purge operation;

DESCRIPTION OF THE INVENTION

Figure 5:
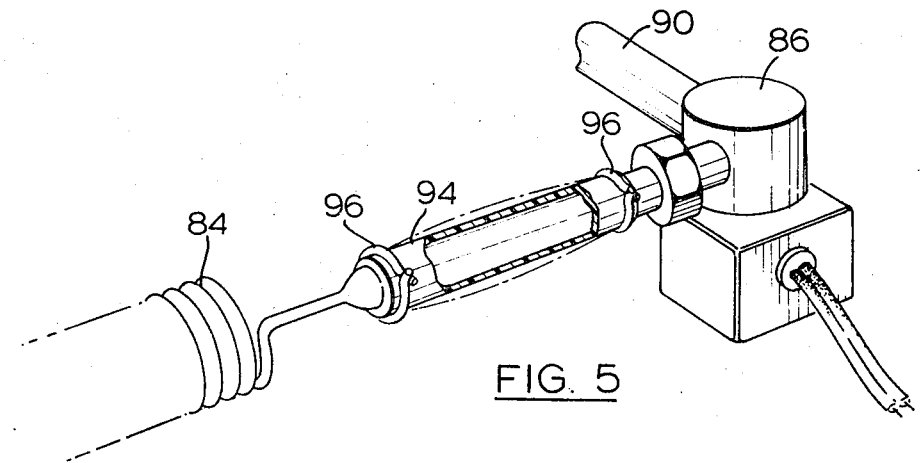
FIG. 5 is a perspective view similar to FIG. 4 but illustrating another embodiment of a component for accumulating a charge of water for the purge operation.

An appliance 10 constructed in accordance with the invention is illustrated in FIG. 1 of the drawings and comprises a base 12 mounted upon vertically adjustable legs 14 with feet of suitable insulating material, such as nylon, one at each corner for levelling the unit upon a suitable supporting surface and inhibiting heat transfer thereto and a lid or cover 16 hingedly connected as at 18 at the upper rear edge of base 12 to swing from the upright position shown in FIG. 1 forwardly to a position in overlying registration with the base 12.

The base 12 includes an exterior housing in the form of a sheet metal enclosure, preferably of type 304 stainless steel 20 gauge and an all welded construction, presenting side walls 20, rear wall 22 and front wall 24 with a removable bottom plate 26 and open at the top.

Mounted centrally within the sheet metal enclosure of base 10 upon a surrounding supporting frame 72 secured to the sheet metal walls of the base 12 and suitably insulated by means of a baffle, not illustrated from electrical instrumentation mounted adjacent the front wall 24 is a steam generating unit or boiler 28.

The boiler 28 in the preferred embodiment illustrated includes as best seen in FIGS. 2 and 3 an arrangement of tube lengths of brass, three like tube lengths 30, 32 and 34 of circular cross-section in spaced parallel relation welded at their adjacent rearward ends to a transverse tube length of brass 36 of rectilinear cross-section in a manner such that the bores of all tube lengths are in communication with one another.

The forward ends of each tube length 30, 32 and 34 are preferably permanently sealed by suitable closures or plugs 38, 40 and 42 respectively.

The transverse tube length 36 is provided with a removable plug 44 threadably engageable with a tapped opening in a suitable fitting 46 at one end to provide access for the introduction of chemicals or other cleaning agents for removal of scale or deposits and preferably permanently sealed by a suitable closure or plug 48 at the other end.

In the embodiment illustrated tube lengths 30 and 34 are provided with spaced apertures 50 and 52 respectively, whereas the central tube length 32 is unapertured and is provided at its forward end with a suitable inlet conduit fitting 54 which is adapted to be connected to a source of water for the boiler through a conduit system to be described.

As best seen in FIG. 3 each of the apertures 50 and 52 of tube lengths 30 and 34 are fitted with a stainless steel tubular element 56 provided with a reduced orifice 58 for the emission of steam generated in the boiler.

Electrical resistance elements 60 for generating heat for the evaporation of water to be supplied to the boiler are arranged to extend longitudinally of each of the tube lengths 30, 32 and 34 and preferably have a U-shaped configuration as illustrated in FIG. 2 in broken lines.

Tube lengths 30, 32, 34 and 36 and resistance elements 60 are cast within an aluminum body 62 in the manner illustrated in FIG. 3, the body or casting 62 having a configuration to present a generally flat upper surface 64 with the open ends of tubular fittings 56 flush therewith, and depending body portions 66 encasing or enveloping each tube length 30, 32, 34, 36 and resistance elements 60 in the relationship illustrated, but leaving suitable access openings, not illustrated, for the removable plug 44 of transverse tube length 36 and for making connections to the electrical resistance elements 60.

In addition the aluminum body or casting 62 is provided with integral spaced lugs 68 upstanding from the upper surface 64 thereof, and of uniform height, which spaced lugs serve to support an overlying thin perforated removable plate 70, of hard aluminum, upon which articles of food to be processed are to be deposited.

The perforated plate 70 is surrounded by the upper section of support frame 72, which takes the form, in the preferred embodiment, of mitred sections of a suitable aluminum extrusion. Frame 72 has a configuration to present an inwardly extending ledge 74 below the flat upper surface 76 thereof to register therewithin and support the perforated plate 70 peripherally such that the upper surface 76 and the upper surface of perforated plate 70 are flush, and with the upstanding lugs 68 of the aluminum body or casting supporting perforated plate 70 centrally thereof.

The lid or cover 16 is in the form of a rectilinear sheet metal enclosure, preferably anodized aluminum, 16 gauge, and is counterbalanced through suitable mountings, not illustrated, so that the lid in the upright position will remain stable.

When the lid 16 is swung from the position illustrated in FIG. 1 to a position in overlying registration with the base 12 the lower edges of lid 16 are adapted to bear upon the upper surface 76 of support frame 72 under its own weight to define with the base an oven or enclosure for the processing of articles of food deposited upon perforated plate 70 in an atmosphere of steam generated by boiler 28 and emitted to the enclosure from the tubular lengths 30 and 34 of boiler 28 through the orifices 58 of tubular fittings 56.

In addition the lid 16 is provided with a suitable handle formation, not illustrated, for raising and lowering the lid and is adapted to be mounted to extend outwardly of the front wall of the lid in the usual manner.

Available water sources for supplying the steam generating system will normally have a degree of hardness or concentrations of dissolved minerals that will corrode or leave deposits upon the inner surfaces of the associated conduits, chambers and orifices if supplied directly to the system.

Corrosion and deposition within the system will require maintenance and replacement of parts during which time the appliance must be taken out of operation, and all of which is undesirable. As a consequence it is advantageous, even necessary, in certain circumstances to treat the water supplied by passing it through suitable equipment designed to remove the ionizable solids as far as possible before passing it to the system.

Water conditioning equipment suitable for use with an appliance constructed in accordance with the invention is available from commercial sources, for example, from Illinois Water Treatment Co. of Rockford, Ill., or from Culligan of Canada Limited of Toronto, Canada.

Water for evaporation in the boiler 28 will normally be supplied from available sources such as water mains serving the municipality or community at a substantial pressure of the order of 60 p.s.i.

In order to utilize available water conditioning equipment usually it will be necessary to employ a water pressure regulator having the capacity to reduce the water pressure to a value of the order of 15 p.s.i.

Figure 6:
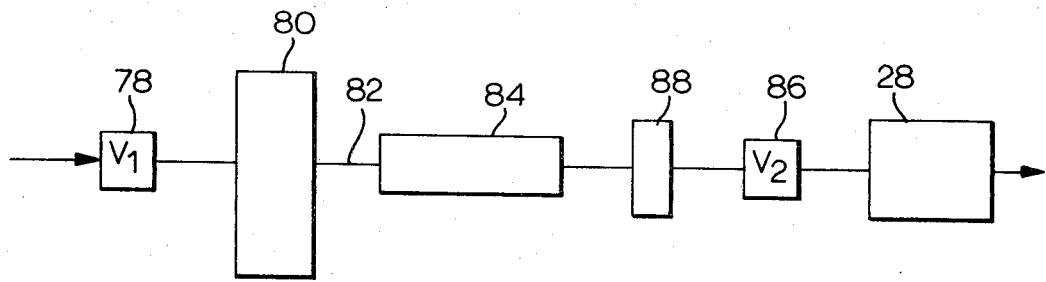
FIG. 6 is a diagrammatic illustration showing the preferred arrangement of components constituting the steam generating system for the appliance of FIG. 1.

With reference to the diagrammatic illustration of FIG. 6 showing one arrangement of the components of the steam generating system, water supplied from an available source will be passed in the direction of the arrows first through a suitable water pressure regulator 78 to reduce the pressure to the order of 15 p.s.i.; then to water conditioning equipment 80 to remove the ionizable solids as far as possible; then through a suitable conduit connection 82 to a length of capillary tube 84.

From capillary tube 84 the treated water can be passed either directly to solenoid operated valve 86 for shutting off the water supply to the boiler 28 and then through suitable conduit connections to the inlet conduit fitting 54 to central tube length 32 of boiler 28; or alternatively from capillary tube 84 to a distensible reservoir 88 and then to solenoid operated valve 86.

Capillary tube 84 is preferably of stainless steel, the bore and length thereof depending upon the flow rate desired to achieve optimum conditions of temperature and moisture content in the oven or food compartment of the appliance.

With reference to FIG. 2 of the drawings the capillary tube 84 is shown in a convoluted form taking the configuration of a tightly wound helix between conduit connection 82 leading from the water source through a suitable connection 91 to solenoid operated valve 86.

By forming the length of capillary tube 84 into a tightly wound helix throughout a substantial portion of its length the structural strength of the component is increased which minimizes the possibility of damage during handling, installation or replacement as well as minimizing the space requirements for the component within the appliance.

With reference to FIG. 4 the helically wound capillary tube 84 is arranged upstream of one embodiment of distensible reservoir in the form of a bellows-type accumulator 92 whereas in FIG. 5 showing an alternative the capillary tube 84 is arranged upstream of a length of resiliently expendible silicone rubber tubing 94 installed by means of suitable conduit connections and associated clamps 96.

The distensible reservoirs constituted by the alternative embodiments of bellows-type accumulator 92 and silicone rubber tubing 94 upon closing of the solenoid operated valve 86 distend to accumulate a charge of water under the pressure impressed by the water source and upon opening of the solenoid operated valve 86 contract to expel the accumulated charge of water downstream to enter central tube length 32.

The solenoid valve 86 may be energized through circuitry leading to a source of electrical potential by means of a switch 98 in any suitable manner with the switch 98 being located in the front wall 24 of the base 12.

Electrical resistance elements 60 likewise may be energized through suitable circuitry leading to a source of electrical potential through a thermostatic switch 100 provided with temperature settings over a range up to 600°F approximately and located in the front wall 24 of the base 12.

In one commercial application of the invention brass tubing of three-fourths inches outer diameter and a wall thickness of one-sixteenth inches was selected from which tube lengths of 10½ inches were cut constituting tube lengths 30, 32 and 34 of the steam generating system.

A tube of slightly greater dimensions than three-fourths inches in depth and width and of one-sixteenth inches thickness and 7½ inches long was selected constituting tube length 36.

In that embodiment each tube length 30 and 34 was provided with five tubular fittings 56, in which the diameter of the orifices 58 were of the order or 0.055 inches.

The dimensions of the lid or cover 16 defining the oven or food compartment in overlying registration with the base 12 were of the order of 3 inches in depth by 14 ⅞ inches in width by 24 ⅞ inches in length.

Each of the resistance elements 60 had a rating of 1,000 watts.

In order to achieve optimum temperature and moisture content conditions within the oven or food compartment of the appliance over a range of temperatures up to 600°F approximately it was calculated that the water supplied to the boiler 28 should be of the order of 0.75 ounces per minute which was achieved by selecting a stainless steel capillary tube having an inner diamter of 0.026 inches and a length of 36 inches under a head of water pressure of the order of 15 p.s.i.

Operation of Appliance

It will be understood that when the appliance 10 is to be placed in operation first the temperature for processing the particular article of food will be selected. The thermostatic switch 100 will then be set at such temperature thereupon energizing the resistance elements 60.

To illustrate, in the commercial embodiment a moist atmosphere was achieved by a setting of 360°F and a super heated or dry atmosphere was achieved by a setting of 600°F.

Following energization of resistance elements 60 the heat necessary to vaporize water to be introduced will be conducted through the aluminum casting 62 to the assembly of tube lengths 30, 32, 34 and 36.

Upon actuation of switch 98 to open solenoid operated valve 86 water will be delivered into the central tube length 34 at the desired flow rate determined by the input water pressure and the characteristics of the capillary tube 84.

Upon discharge into the central tube length 34 heat of evaporation will be taken on by the water upon contact with the surfaces of tube length 34 with the vapour expanding into the transverse tube length 36 to outer tube lengths 30 and 34 during which passage additional heat will be absorbed and then exhausting into the oven or food enclosure defined by the lid 16 through the orifices 58 are as indicated by the arrows in FIG. 2.

As the lid 16 rests under its own weight upon upper surface 76 of the peripheral frame 72 the atmosphere of steam generated therein will tend to escape to the atmosphere along the line of contact avoiding any pressure build up during the period in which it is operated.

It is desirable upon placing the appliance 10 in operation to purge the oven or food compartment of the atmosphere. This is accomplished, as described, by installing a distensible reservoir of the type illustrated in FIGS. 4 and 5 at 92 and 94 to accumulate a charge of water under conditions of increased water pressure when solenoid valve 86 is closed, contracting under conditions of decreased pressure when solenoid valve 86 is opened to expel the water charge downstream into the boiler 28 at lower pressure thereby supplying a surge of water in a quantity sufficient to purge the oven or food compartment of the atmosphere and replace it with steam substantially immediately.

Thereafter under the constant rate of flow regulated by the calibrated capillary tube 84 optimum conditions of temperature and moisture content will prevail within the oven or food compartment during the interval of time when the appliance 10 is in operation.

When the appliance 10 is to be shut down the switch 98 is actuated closing solenoid operated valve 86, whereupon the distensible reservoir will respond to accumulate a charge of water for the next sequence.

The thermostatic switch upon shut-down need not be turned off but may be left at the same or set to a lower temperature.

In any event the aluminum body or casting 62 will tend to hold the heat generated for a period of time after shut-down and can be used to accelerate the start-up of the next sequence.

While the preferred embodiments of the invention has been described and illustrated it will be understood that various modifications or changes may be made in the structures illustrated and described without the departing from the spirit and scope of invention as defined in the appended claims.

What is claimed is:

1. In apparatus for generating an atmosphere of steam within an enclosure by means of a boiler adapted to be supplied from a source of water under pressure through a conduit system, means for regulating the flow of water to said boiler comprising a capillary tube element located in said conduit system of a bore and length selected to pass water therethrough to said boiler at a flow rate sufficient only to generate an atmosphere of steam within said enclosure over a selected range of temperatures under given conditions of input water pressure and enclosure volume and water pressure regulating means located in said conduit system in series with said capillary tube element for establishing a condition of constant flow within said range of temperatures.

2. Apparatus according to claim 1 in which valve means for shutting off the supply of water to said boiler is located in said conduit system downstream of said length of capillary tube and resiliently distensible means is located in said conduit system between said valve means and said length of capillary tube responsive when said valve is closed to accumulate a charge of water and to expel the charge of water downstream to said boiler when said valve is opened.

3. In apparatus for generating an atmosphere of steam within an enclosure at atmospheric pressure for the processing of articles of food or the like, a steam generating system comprising a boiler, restricted passage means leading from said boiler to said enclosure, conduit means for supplying said boiler from a source of water under pressure including a capillary tube element located in said conduit means of a bore and length selected to pass water therethrough at a flow rate sufficient only to generate an atmosphere of steam within said enclosure at least over a range of temperatures up to about 600°F, water pressure regulating means located in said conduit system in series with said capillary tube element for establishing a condition of constant flow within said range of temperatures and valve means located in said conduit means for shutting off the supply of water to said boiler.

4. Apparatus according to claim 3 in which said length of capillary tube element has a convoluted configuration throughout a portion of its length.

5. Apparatus according to claim 4 in which said convoluted configuration of said length of capillary tube is helical.

6. Apparatus according to claim 3 in which said valve means is located in said conduit system downstream of said length of capillary tube and resiliently distensible means is located in said conduit system between said valve means and said length of capillary tube responsive when said valve means is closed to accumulate a charge of water and to expel the charge of water downstream to said boiler when said valve is opened.

7. Apparatus according to claim 6 in which said resiliently distensible means comprises a length of flexible tubing.

8. Apparatus according to claim 6 in which said resiliently distensible means comprises a bellows-type accummulator.

* * * * *